Nov. 9, 1943.   J. K. RUSSELL   2,333,890
FILTER HOUSING
Filed May 10, 1941
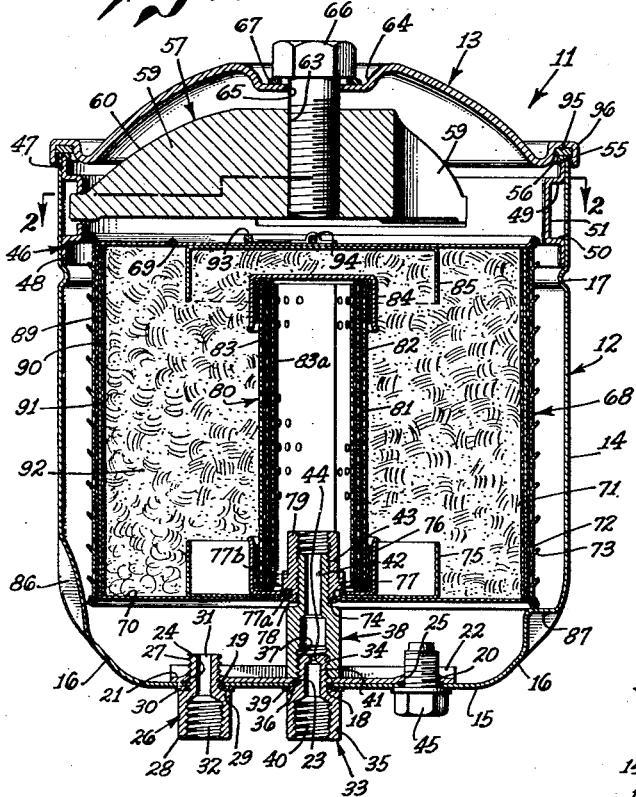
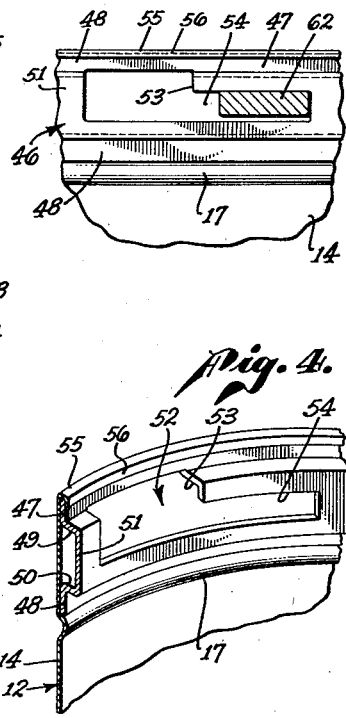
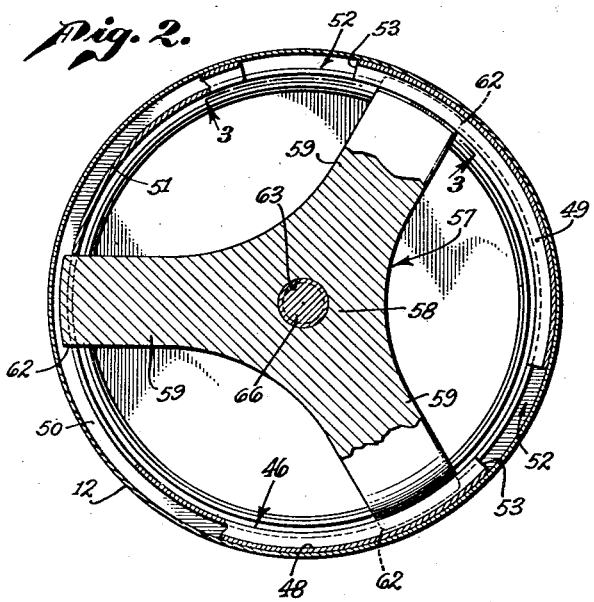
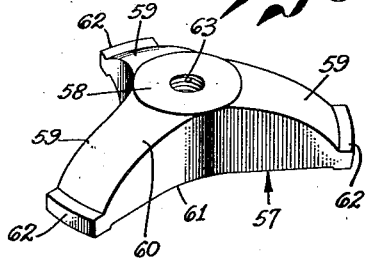
INVENTOR
JOHN K. RUSSELL
BY
HARRIS, KIECH, FOSTER & HARRIS
FOR THE FIRM
ATTORNEYS Patented Nov. 9, 1943

2,333,890

UNITED STATES PATENT OFFICE 2,333,890

FILTER HOUSING

John K. Russell, Los Angeles, Calif., assignor to Luber-Finer, Inc., Los Angeles, Calif., a corporation of California Application May 10, 1941, Serial No. 392,888

2 Claims. (Cl. 220—25)

My invention relates to a filter device and finds particular utility when used in the oil circulating system of an internal combustion engine, and an embodiment of my invention well adapted for such use is hereinafter described.

In constructing a container and cover for a filter element for such use, it has been customary to make the container or housing of comparatively thick metal to provide for a threaded connection between the cover and container of sufficient strength to clamp the cover very firmly upon the container.

One of the objects of my invention is to provide a filter device in which the container for the filter element may be stamped from sheet metal of a thickness sufficient to resist the fluid pressure in the oil circulating system, but insufficient to permit the threading of the cover to the container or to provide the rigidity required for firmly clamping the cover to the housing in accordance with the prior practice. More specifically, it is an object of my invention to provide a filter which includes a thin walled container for the filter element, together with means for locking or compressing the cover on the container so that the cover may be quickly and easily removed therefrom. My invention contemplates the provision of such a clamping or locking means formed of few parts, which are substantially concealed within the container when the cover is locked thereon, so that such parts need not be finished or polished.

Another object of my invention is the provision of a filter device including a container for the filter element, which container has thereon exterior connections for inlet and outlet lines facilitating the installation and the removal of the filter device in the oil circulating system of an engine.

Another purpose of my invention is to provide a filter device including a container for the filter element having therein means for mounting the filter element and retaining it in proper position during use and permitting quick removal and installation of the filter element within the container.

Another object of my invention is the provision of a filter device of the class described which includes a filter element with means thereon facilitating the rapid attaching of the filter element to and its removal from a housing or container. It is also an object of my invention to provide a cylindrical filter element for such a device, in which the paths of travel of the oil therethrough are radial of the element, while avoiding the use of a central oil pipe extending throughout the length of the element.

Among other objects of my invention is the provision of a filter device, such as described, which is inexpensive in manufacture, compact and pleasing in appearance, and positive in operation. An embodiment of my invention capable of performing the objects and providing the advantages stated is illustrated in the accompanying drawing in which Fig. 1 is a vertical sectional view;

Fig. 2 is a sectional view taken as indicated by the line 2—2 of Fig. 1;

Fig. 3 is a fragmentary sectional view taken as indicated by the line 3—3 of Fig. 2;

Fig. 4 is a fragmentary perspective view of the inner surface of the upper portion of the container; and Fig. 5 is a perspective view of the tension-transmitting member used in this embodiment of my invention.

Referring to the drawings, which are for illustrative purposes only, the numeral 11 indicates a complete filter device of my invention which includes a housing, shell, or container 12 and a cover or closure member 13. The container 12, which is circular in cross section, includes a side wall 14, a bottom wall 15, and a downwardly converging wall 16 connecting the side wall 14 and bottom wall 15.

Formed in the container 14 near its upper end is an inwardly extending projection or rib 17 substantially semicircular in cross section and extending completely around the container 12. Formed in the bottom wall 15 of the container 12 is a central opening 18 and two openings 19 and 20 spaced from the central opening 18, the axes of the three openings being in the same vertical plane. Positioned upon the inner side of the bottom wall 15 is a reinforcing member or plate 21, which may be provided with upwardly projecting flanges 22 along its edges for increasing its rigidity. The reinforcing plate 21 is provided with an opening 23 registering with the opening 18 in the bottom wall 15. Also formed in the reinforcing plate 21 are openings 24 and 25, both of which are threaded and which register with the openings 19 and 20, respectively, in the bottom wall 15.

An inlet boss 26 includes a reduced portion 27 threaded into the opening 24 in the reinforcing plate 21 and an enlarged portion 28 separated from the reduced portion 27 by an annular shoulder 29. A gasket 30 is clamped between the annular shoulder 29 and the outer surface of the bottom wall 15 when the reduced portion 27 is threaded into the opening 24. The inlet boss 26 is provided with an axial liquid passage 31, a threaded opening 32 communicating with the passage 31 and formed in the enlarged portion 28.

The numeral 33 indicates an outlet boss having an inner reduced threaded portion 34 and an enlarged portion 35 separated by an annular shoulder 36. The reduced portion 34 is threaded into a cavity 37 in a connecting sleeve 38 in the container 12, so that a gasket 39 is compressed between the annular shoulder 36 and the outer surface of the bottom wall 15. Formed in the lower end of the enlarged portion 35 of the outlet boss 33 is a threaded cavity 40 communicating with an axial liquid passage 41 extending to a small opening or orifice 44 in the inner end of the outlet boss 33 and communicating with a liquid passage 42 provided in the connecting sleeve 38. The connecting sleeve 38 includes an upper reduced threaded portion 43. The outlet boss 33 is not threaded to the reinforcing plate 21, but is secured in place by its threaded engagement with the connecting sleeve 38 inside the container 12.

Securing the reinforcing plate 21 against movement relative to the bottom wall 15 is a bolt 45 threaded into the opening 25 in the reinforcing plate 21 so that its head engages the lower surface of the bottom wall 15. The removal of the bolt 45 provides an outlet drain through openings 20 and 25.

Positioned within the container 12 adjacent the upper edge of the side wall 14 is a first engaging means or member or ring 46. The ring 46 may be formed in a complete annulus or a substantially complete annulus of a ribbon of sheet iron, for example, of a thickness substantially greater than the thickness of the container walls 14, 15, and 16 and sufficient to transmit over substantially all of the circumference of the side wall 14 the force involved in securing or clamping the cover 13 to the container 12. The ring 46 may conveniently be stamped to the desired shape, as best illustrated in Figs. 1 and 4, which includes upper and lower vertical legs 47 and 48, respectively, portions 49 and 50 extending inwardly from the adjacent extremities of the legs 47 and 48, respectively, and a central vertical portion 51 extending between the portions 49 and 50. Formed in the ring 46 is a plurality of bayonet slots 52, illustrated in the drawing as three in number, each including a vertical entrance opening 53 formed in the inwardly extending portion 49 and central vertical portion 51 and communicating with a circumferential opening 54 formed in the central vertical portion 51.

The ring 46 is formed so that it may be installed in the upper portion of the container with the lower edge of the lower leg 48 thereof supported upon the inwardly extending rib 17 of the container 12, and the outer surfaces of the vertical legs 47 and 48 engaging the inner surface of the vertical wall 14 of the container. The vertical wall 14 is then bent inwardly over the upper edge of the vertical leg 47, as indicated by the numeral 55, and inwardly against the inner surface of the upper vertical leg 47, as shown by the numeral 56, thus securing the ring 46 in place within the container 12.

A second engaging means or member or tension-transmitting means is provided in the form of a spider 57, which includes a central portion 58 and three projecting radial legs 59 extending therefrom. Each of the legs 59 has an upper surface 60 curving outwardly and inwardly and a horizontal lower surface 61, and is provided at its extremity with an engaging portion 62 of dimensions to pass through the entrance opening 53 and along the circumferential opening 54 of any one of the bayonet slots 52. The central portion 58 is provided with a threaded opening 63 extending vertically therethrough. The spider 57 may conveniently be cast of iron and requires no polish or finishing, since it, like the ring 46, is concealed within the container.

The cover 13 is formed of metal of a thickness greater than the walls of the container 12 and sufficient to resist the compressive forces resulting from clamping it to the container and is provided with a central dished portion 64 having therein an opening 65 through which a tension member or bolt 66 is extended and threaded into the opening 63 of the spider 57, clamping a gasket 67 against the outer surface of the cover 13 adjacent the opening 65. The cover 13 may be conveniently shaped by a stamping operation.

A filter element within the container is indicated by the numeral 68. The filter element 68 includes top and bottom imperforate plates or walls 69 and 70, respectively, the peripheral edges of each of which are formed U-shaped in cross section to embrace the ends of a cylindrical wall member 71. The cylindrical wall member 71 is provided with a plurality of openings 72 therein, which may be conveniently formed by slitting the wall of the element 68 and pressing the portions adjacent the slits outwardly to provide inclined baffles 73.

The bottom wall 70 of the filter element 68 is provided with a central opening 74, registering with a central opening of a cup 75 and a central opening of a lower cap 76. The bottom wall 70, cup 75, and cap 76 are clamped together between an annular shoulder 77 and an outwardly directed end flange 78 formed by upsetting or swaging the end of an inlet sleeve 79 extending through the registering openings. Projections 77a are formed on the lower surface of the shoulder 78 and extend through radial openings in the cap 76 and cup 75, thus securing the clamped assembly against relative rotation of its parts. Similar projections 77b are formed on the upper surface of the shoulder 77. The inlet sleeve 79 is provided with interior threads for reception of the reduced portion 43 of the connecting sleeve 38.

The numeral 80 indicates a conduit or liquid collecting means or member positioned axially of the filter element 68 and extending upwardly in the filter element.

As illustrated in the drawing the conduit 80 may be formed by rolling into cylindrical form a single layer 81 of fabric of one or more thicknesses of cheesecloth or the like and a perforate metal sheet 82. The fabric layer 81, of lesser width than the perforate sheet 82, is laid upon the perforate sheet, and the two are rolled together so that the perforate metal sheet provides an outer perforate wall 83 and an inner perforate wall 83a with the fabric layer 81 therebetween. The fabric layer 81 is longer than the perforate sheet 82 so that its ends project beyond the ends of the cylinder formed by rolling them together, and these projecting end portions of the fabric layer are pressed around the cylinder thus formed. More than one fabric layer and perforate sheet may be employed if desired, the layers and sheets being stacked in alternating relationship and rolled together.

An upper cap 84 is pressed upon the upper end of this cylinder and the end portion of the fabric layer around the cylinder, and the lower cap 76 with the inlet sleeve 79 is pressed upon the lower end of the cylinder, and the end portion of the fabric layer therearound, thus preventing any severed threads in the fabric layer from passing into the conduit 80, and preventing the perforate sheet 82 and the fabric layer 81 from unrolling. The cap 76, cup 75, and bottom wall 70 of the filter element are secured together by upsetting the end of the inlet sleeve 79 before the bottom wall 70 is connected to the cylindrical wall member 71.

The metal walls 83 and 83a are made of a length less than the distance between the top and bottom walls 69 and 70 of the filter element 68, so that the liquid collecting member 80 terminates below the top of the filter element 68, and liquid is thus prevented from flowing to the collecting member without passing through the filter medium around this member, even though such medium should settle and separate a slight distance from the top wall 69. An upper cup 85 may be secured to the top wall 69 with its lower edge extending below the top of the liquid collecting member 80 to further prevent such unfiltered flow.

With the filter device assembled as illustrated in Fig. 1, in order to remove the filter element 68 and replace it, it is necessary only that the bolt 66 and cover 13 be removed and the spider 57 be rotated until the engaging portions 62 of the spider 57 can be moved in the bayonet slots 52 to the entrance openings 53, whereupon the spider 57 may be removed from the container 12. Thereafter by simply rotating the filter element 68, it may be disconnected from the connecting sleeve 38 and lifted from the container 12. A bail 93 may be swingably mounted in a ring 94 upon the top wall 69 of the filter element 68 to facilitate the rotation and elevation of the filter element 68. The installation of a new filter element 68 requires only the lowering of the element into the container 12 and the threading of the cylindrical sleeve 76 in its lower end upon the connecting sleeve 38. Indentations 86 are formed in the lower portion of the side wall 14 and in the downwardly converging wall 16 to guide the lower end of the filter element centrally in the container 12 during its insertion therein. Indentations 87 in the converging wall 16 define a seat for the bottom wall 70 of the filter element 68 when it is installed.

Thereafter the spider 57 is placed upon the container with the engaging portions passing through the entrance openings 53 of the bayonet slots 52 in the ring 46. The spider 57 is then rotated until the engaging portions 62 pass into the circumferential openings 54 of the bayonet slots 52 to the position illustrated in Fig. 3. Thereafter the cover 13 is placed on the container and the bolt 66 is threaded into the spider 57, clamping an annular gasket 95 between a peripheral flange of the cover 13 and the inturned portion 55 of the container 12, and clamping the gasket 67 between the head of the bolt 66 and the cover 13. The cover 13 is thus locked in fluid-tight relationship with the container 12.

The installation of the filter device of my invention in the oil circulating system of an internal combustion engine is facilitated by the inlet and outlet bosses 26 and 33, respectively, which are carried by the container. The reinforcing plate 21 provides the necessary strength to the thin walled container 12 for supporting the inlet and outlet pipes connected to the bosses 26 and 33, and also provides means for threading the inlet boss into the container assembly. The reinforcing plate 21 likewise provides the required rigidity to the thin bottom wall 15 of the container for supporting thereon the filter element 68. This reinforcing plate 21 is securely held in place by its threaded engagement with the inlet boss 26 and the bolt 45.

In operation, the oil entering through the inlet boss 26 fills the space around the filter element 68 within the container 12 and cover 13. The oil passes radially inwardly through the openings 72 in the cylindrical wall 71 of the filter element and through the fabric layers 89 and 90 and the screen cylinder 91 into the filtering material 92. The filtered oil passes inwardly through the fabric layer or layers 81 and the perforate metal walls 83 and 83a to the interior of the oil collecting means 80.

The construction of the liquid collecting means 80 eliminates the necessity for a central pipe extending throughout the filter element 68 and permits the installation of the filter element 68 within the container by making only a single connection between them.

The considerable force required to securely clamp the cover 13 in place is transmitted through the bolt 66 and spider 57 to the ring 46 which applies it uniformly to substantially the entire circumference of the thin walled container 12. The construction hereinbefore described permits the container 12 to be made of a thin metal, for example, sheet steel of about 20 gauge, and permits the container 12 to be quickly and inexpensively formed in a stamping operation. The ring 46, as previously described, may be stamped and the spider 57 may be cast, and, since these parts as well as the reinforcing plate 21 are concealed within the container, they require no surface finishing or polishing.

Forming the ring 46 so that it is of channel shape in cross section not only provides space between the vertical wall 14 of the container and the central vertical portion 51 of the ring 46 into which the engaging portion 62 of the legs 59 may project, but also strengthens the ring 46 against deformation and increases its resistance to the axially directed forces imposed when the cover is clamped to the container 12.

The termination of the collecting member 80 substantially below the top plate 69 of the filter element 68 and the upper surface of the filter material 92 prevents the passage of unfiltered oil into the collecting means 80 and insures that, even though the filter material 92 may become compacted and separated a short distance from the upper plate 69, no oil can enter the collecting means 80 without first being filtered by passage through some of the filter material 92.

It will be seen that by providing the reinforcing plate 21 in the bottom of the container 12, my invention makes possible a filter unit including a thin walled container, while providing means for securely attaching therto, and in liquid-tight relationship therewith, inlet and outlet bosses, facilitating the installation of the filter device in the oil circulating system of an engine, and a filter unit in which the filter element is supported in fixed relation to the thin walled container without undue stresses upon such container.

The inlet and outlet bosses 26 and 33 are made of the same dimensions so that they are interchangeable. However, only one of them is provided with the small opening or orifice 44. If it is desired to subject the container 12 to the full pressure of the oil circulating system, the boss with the orifice 44 is employed as an outlet boss, where it restricts the flow of oil through the container 12 so that only the desired proportion of the oil flowing through the oil circulating system is passed through the filter. However, if it is desired to subject the container 12 to a pressure less than the pressure in the oil circulating system, the boss with the orifice 44 therein is employed as an inlet boss.

While that embodiment of my invention hereinbefore illustrated and described is fully capable of performing the objects and providing the advantages primarily stated, and, while the usefulness of my invention has been illustrated by its application to a filter device for use in oil circulating systems of internal combustion engines, my invention is not limited to the embodiment hereinbefore illustrated and described or to such use.

I claim as my invention:

1. In a container, the combination of: a thin walled shell provided with an inwardly extending projection; a seat on said shell; a closure member; a first tension-transmitting member; adjustable tensioning means connecting said members; and a second tension-transmitting member between said seat and said projection, said second tension-transmitting member being channel shaped in cross section and providing bayonet slots in which said first tension-transmitting member may be removably positioned, whereby said closure member is clamped to said seat when said means is subjected to tension.

2. In a container the combination of a thin-walled shell having an open end and formed to provide an inwardly projecting annular bead near said end and an inwardly projecting annular flange at said end; a closing cover for said end having a central aperture; a sheet metal annulus seated against the inner surface of said shell between said bead projection and said flange and thereby held against longitudinal displacement in said shell, the central portion of said annulus having an annular inward projection, channel-shaped in cross section provided with circumferentially extending bayonet type slots; a spanning member across said shell, said spanning member and slots being formed for mutual engagement to hold said spanning member against longitudinal displacement in said shell when in one relative radial position and to allow movement of said spanning member through said open end when in another relative radial position; and a bolt means disposed in said cover aperture and centrally connected to said spanning member and adapted to draw said cover and spanning member toward each other.

JOHN K. RUSSELL.